United States Patent
Takeyama

(10) Patent No.: US 7,397,594 B2
(45) Date of Patent: Jul. 8, 2008

(54) DISPLAY ELEMENT, DISPLAY AND METHOD FOR MANUFACTURING DISPLAY

(75) Inventor: Toshihisa Takeyama, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 379 days.

(21) Appl. No.: 10/536,430

(22) PCT Filed: Nov. 13, 2003

(86) PCT No.: PCT/JP03/14453

§ 371 (c)(1),
(2), (4) Date: May 25, 2005

(87) PCT Pub. No.: WO2004/049052

PCT Pub. Date: Jun. 10, 2004

(65) Prior Publication Data

US 2006/0050359 A1    Mar. 9, 2006

(30) Foreign Application Priority Data

Nov. 28, 2002  (JP) ............... 2002-345359
Nov. 28, 2002  (JP) ............... 2002-345360
Nov. 28, 2002  (JP) ............... 2002-345361
Dec. 9, 2002   (JP) ............... 2002-356614

(51) Int. Cl.
  *G02F 1/15* (2006.01)
  *G02F 1/153* (2006.01)

(52) U.S. Cl. ............... 359/265; 359/270; 359/275

(58) Field of Classification Search ......... 359/265–275; 345/105, 107
See application file for complete search history.

(56) References Cited

U.S. PATENT DOCUMENTS

| 5,411,761 | A   |   | 5/1995  | Inokuchi et al.    |         |
|-----------|-----|---|---------|--------------------|---------|
| 6,132,585 | A   | * | 10/2000 | Midorikawa et al.  | 205/123 |
| 6,178,034 | B1  | * | 1/2001  | Allemand et al.    | 359/265 |
| 6,608,129 | B1  | * | 8/2003  | Koloski et al.     | 524/403 |
| 7,057,789 | B2  | * | 6/2006  | Shinozaki et al.   | 359/265 |
| 2002/0015881 | A1 | * | 2/2002 | Nakamura et al.   | 429/111 |
| 2004/0265587 | A1 | * | 12/2004 | Koyanagi et al.  | 428/398 |

FOREIGN PATENT DOCUMENTS

| EP | 1 347 330 A1    | 9/2003 |
|----|-----------------|--------|
| JP | 57-144530       | 9/1982 |
| WO | WO 02/052339 A1 | 7/2002 |

OTHER PUBLICATIONS

European Search Report.

* cited by examiner

*Primary Examiner*—Ricky L Mack
*Assistant Examiner*—Tuyen Q Tra
(74) *Attorney, Agent, or Firm*—Finnegan, Henderson, Farabow, Garrett & Dunner, L.L.P.

(57) ABSTRACT

A display element containing: (a) a first electrode which is transparent and is controlled by a driver element; (b) a second electrode; and (c) a solid polymer electrolyte layer containing a colorant and metal ions, the solid polymer electrolyte layer being provided between the first electrode and the second electrode, wherein the first electrode has an anti-reflecting layer on a side opposite to the solid polymer electrolyte layer.

14 Claims, 5 Drawing Sheets

US 7,397,594 B2

DISPLAY ELEMENT, DISPLAY AND METHOD FOR MANUFACTURING DISPLAY

TECHNICAL FIELD

The present invention relates to a display element, a display apparatus and a manufacturing method thereof, utilizing a material, which changes color by an electrochemical redox reaction, as a display material.

BACKGROUND

Heretofore, it has been practiced to print the articles, which are delivered as an electronic document, as a hard copy for reading, however, in recent years, a display element, which enables reading without printing a hard copy, has been desired because an increasing volume of articles are delivered due to popularization of intranet and internet or increase of transmission speed.

As these display elements for reading, there is a CRT, a liquid crystal display or an organic EL display. However, these displays cause significant fatigue because of humane technological reasons due to being emission types and are pointed out not to withstand reading for a long time. Further, there is a disadvantage that a reading place is limited to places where a computer can be installed.

To overcome these disadvantages, recently proposed are a reflection type display which is so-called a paper like display or an electronic paper, and primarily includes such as a method to transfer colored particles between electrodes by electrophoresis (for example, refer to patent literature 1), a method to rotate a particles provided with dichroism by a magnetic field (for example, refer to patent literature 2), or an electrochromic display element which utilizes a redox reaction of a metal ion (for example, refer to patent literatures 3 and 4).

Among these, in an electrochromic display element, which utilizes a redox reaction of a metal ion, there are proposed one provided with a white reflective plate on the back surface (for example, refer to patent literature 5) and one in which a colorant is incorporated into polymer solid electrolyte to increase the whiteness (for example, refer to patent literature 6). However, they cannot be said sufficient as whiteness against human vision.

[Patent Literature 1] U.S. Pat. No. 6,120,588
[Patent Literature 2] U.S. Pat. No. 5,754,332
[Patent Literature 3] JP-A No. 10-133236 (Hereinafter, JP-A refers to Japanese Patent Publication Open to Public Inspection)
[Patent Literature 4] JP-A No. 10-148851
[Patent Literature 5] JP-A No. 11-101994
[Patent Literature 6] JP-A No. 2002-258327

The present invention has been made in view of the above problems, and an objective of this invention is to provide a display element, a display apparatus and a manufacturing method thereof, employing a display material in which the whiteness of the background is sufficiently increased as visional characteristics and which performs color change by an electrochemical redox reaction.

SUMMARY OF THE INVENTION

The above object of this invention has been achieved by the following constitutions.

(1)
A display element comprising:

(a) a first electrode which is transparent and is controlled by a driver element;
(b) a second electrode; and
(c) a solid polymer electrolyte layer containing a colorant and metal ions, the solid polymer electrolyte layer being provided between the first electrode and the second electrode,
wherein the first electrode has an anti-reflecting layer on a side opposite to the solid polymer electrolyte layer.

(2)
The display element of the above-described item 1,
wherein the first electrode is provided on a transparent substrate.

(3)
The display element of the above-described item 2,
wherein the anti-reflecting layer has a smaller reflection index than the transparent substrate.

(4)
The display element of the above-described item 3,
wherein the anti-reflecting layer contains a fluorinated compound as a main component.

(5)
The display element of the above-described item 4,
wherein the metal ions are selected from the group consisting of ions of bismuth, copper, silver, lithium, iron, chromium, nickel, cadmium and mixtures thereof.

(6)
The display element of the above-described item 5,
wherein the colorant is an inorganic pigment, an organic pigment or a dye.

(7)
The display element of the above-described item 6,
wherein the inorganic pigment is selected from the group consisting of a powder of titanium oxide, calcium carbonate, magnesium oxide and aluminum oxide.

(8)
The display element of the above-described item 1,
wherein the colorant is selected from the group consisting of a powder of titanium oxide, calcium carbonate, magnesium oxide and aluminum oxide, and a surface of the powder is treated with a hydrophobicity-giving agent.

(9)
The display element of the above-described item 8,
wherein an average diameter of the colorant is from 0.1 to 1.0 μm.

(10)
The display element of the above-described item 8,
wherein the hydrophobicity-giving agent is a metal alkoxide, an organometallic compound containing a metal-to-halogen bond in the molecule or an organometallic compound containing a metal-to-metal bond in the molecule.

(11)
The display element of the above-described item 1,
wherein the first electrode which is transparent comprises $SnO_2$, $In_2O_3$ or mixtures thereof.

(12)
The display element of the above-described item 1,
wherein the second electrode is a metallic thin film.

(13)
The display element of the above-described item 1,
wherein the solid polymer electrolyte is selected from the group consisting of polyethyleneoxide, polypropyleneoxide, polyethyleneimine, polyethyelenesulfide (each skeleton of which is represented by $-(C-C-O)_n-$, $-(C-C(CH_3)-O)_n-$, $-(C-C-N)_n-$ or $-(C-C-S)_n-$, respectively); polymethylmethacrylate, polyfluorovinylidene, polychlorovinylidene, polycarbonate, polyacryonitrile, the solid polymer electrolyte may be a mixtures of the aforesaid polymers or a plurality of layers of the aforesaid polymers; provided that the solid polymer electrolyte further contains a metal salt or an alkylammonium salt.

(14) A display apparatus comprising a plurality of display elements which forms a display panel, each display element comprising:
  (a) a first electrode which is transparent and is controlled by a driver element;
  (b) a second electrode; and
  (c) a solid polymer electrolyte layer containing a colorant and metal ions, and being provided between the first electrode and the second electrode,
  wherein the first electrode has an anti-reflecting layer on a side opposite to the solid polymer electrolyte layer.

(15) A method of producing a display apparatus comprising the steps in the order named:
  (a) forming an anti-reflecting layer on a transparent substrate;
  (b) forming a transparent electrode and a driver element on the transparent substrate on a side opposite to the anti-reflecting layer;
  (c) forming a solid polymer electrolyte layer containing a colorant and metal ions on the transparent substrate; and
  (d) forming a common electrode at an opposed position to the transparent electrode.

(16) A method of producing a display apparatus comprising the steps in the order named:
  (a) forming a transparent electrode and a driver element on a transparent substrate;
  (b) forming a solid polymer electrolyte layer containing a colorant and metal ions on the transparent substrate;
  (c) forming a common electrode at an opposed position to the transparent electrode; and
  (d) forming an anti-reflecting layer on the transparent substrate at a side opposite to the transparent electrode and the driver element.

(17)
A method of producing a display apparatus comprising the steps in the order named:
  (a) forming a transparent electrode and a driver element on a transparent substrate;
  (b) forming an anti-reflecting layer on the transparent substrate at a side opposite to the transparent electrode and the driver element;
  (c) forming a solid polymer electrolyte layer containing a colorant and metal ions on the transparent substrate on a side which is formed the transparent electrode and the driver element;
  (d) forming a common electrode at an opposed position to the transparent electrode.

MOST PREFERRED EMBODIMENT OF THE INVENTION

In the following, this invention will be detailed.

In the following, embodiments of this invention will be detailed referring to FIGS. 1-6. However, this invention is not limited thereto.

A display apparatus of this invention is characterized in that a polymer solid electrolyte layer containing a metal ion and a colorant and a common electrode, which is common to each pixel as the second electrode, are accumulated in this order on a transparent pixel electrode as the first transparent electrode, which is controlled by a TFT (Thin Film Transistor) as a drive element, and a plural number of display elements provided with an anti-reflecting layer on the surface opposite to the surface, on which a polymer solid electrolyte layer has been accumulated, of a transparent pixel electrode as the first transparent electrode controlled by a TFT as a drive element are arranged in a plane form.

Figure 1:
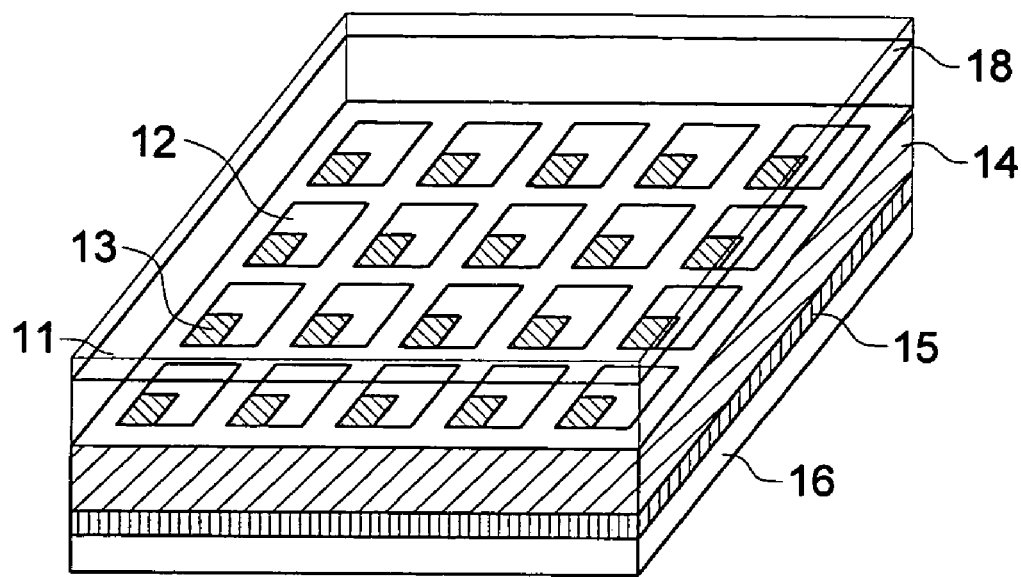
FIG. 1 is a partial oblique view drawing of a display apparatus according to this invention.

FIG. 1 is a partial oblique view drawing of a display apparatus of this invention. A display apparatus of this invention is formed so as to constitute one pixel by combining each one of transparent pixel electrode 12 and TFT 13, and each pixel is arranged on transparent support 11 in a matrix form. A transparent support utilized here includes transparent glass substrates such as a quartz glass plate and a white board glass plate, however, is not limited thereto and also includes resin films of polyester type resin such as polyethylene naphthalate and polyethylene terephthalate; cellulose ester type resin such as cellulose acetate; fluorine type resin such as polyfluorinated vinylidene and fluoroinatedethylene-hexafluoropropylene copolymer, polyether type resin such as polyoxymethylene; polyolefins such as polystyrene, polyethylene, polypropylene, polymethylpentene and norbornene type ring-opening polymer; acryl type resin such as polymethyl methacrylate; polyimides such as polyimide-amide and polyetherimide, polyamide, polycarbonate, polyacetal, polyallylate, polyether ketone, polysulfone and polyether sulfone. In the case of employing these resin films as a support, it is possible to make a rigid substrate form which hardly bends, however, also possible to make a film form constitution provided with flexibility, and further accumulated supports, in which a transparent glass substrate and a resin film, or a plural types of resin films are accumulated, can be appropriately utilized for the purpose of compatibility of flexibility and strength.

An anti-reflecting layer 18 is arranged on the opposite surface to the surface, on which transparent pixel electrode 12 and TFT 13 are provided, that is the so-called observing side, and this anti-reflecting layer 18 is provided to more clearly observe a material described later, which changes color by an electrochemical redox reaction, and preferably has a refractive index not larger than that of transparent support 11.

As a material to form such an anti-reflecting layer is not specifically limited provided the refractive index is not larger than that of transparent support 11, however, for example, metal fluorides such as $ALF_3$, $MgF_2$, $ALF_3 \cdot MgF_2$ and $CaF_2$; and organic fluorides like homopolymers, copolymers, graft polymers or block polymers, containing a fluorine atom, such as vinylidene fluoride and Teflon (R); and modified polymers modified by a fluorine atom containing functional group; are preferable with respect to the refractive index not larger than that of the aforesaid transparent support.

Herein, a method to provide a fluorine-containing compound on a support is not indiscriminately determined depending on the types of a support and a fluorine-containing compound, however, commonly known methods such as a sol-gel method, a vacuum evaporation method, a spattering method, a DVD method and a coating method, or methods described in such as JP-A Nos. 7-27902, 2001-123264 and 2001-264509, can be utilized by appropriate selection.

Transparent pixel electrode 12 is comprised of a transparent conductive film formed as a near rectangle or square pattern, each pixel being isolated, and TFT 13 is arranged on the part of each pixel, as shown in FIG. 1. Herein, as the film of transparent pixel electrode 12 comprising a mixture of $SnO_2$ or $In_2O_3$, that is a so-called ITO film, or a coated film of $SnO_2$ or $In_2O_3$ can be utilized. These ITO film and a coated film of $SnO_2$ or $In_2O_3$ may be doped with Sn or Sb, and such as MgO and ZnO may be further incorporated. Further, as TFT 13, materials utilized in commonly known semiconductor manufacturing techniques employed for such as a liquid crystal display can be utilized by appropriate selection, and also utilized may be an organic TFT comprising organic compounds described in such as JP-A Nos. 10-125924, 10-135481, 10-190001 and 2000-307172.

TFT 13 formed for each pixel is selected by a wiring being not shown in the drawing and controls the corresponding transparent pixel electrode 12. TFT 13 is very effective to prevent cross talk between pixels. TFT 13 is formed, for example, so as to occupy one corner of a transparent pixel electrode, however, it may be provided with a structure in which transparent pixel electrode 12 is piled on TFT 13 in the accumulation direction. Specifically, a gate line and a data line are connected to TFT 13, a gate electrode of each TFT being connected to each gate line, a data line being connected with one end of the source and drain of each TFT 13, and the other end of the source and drain each are electrically connected with transparent pixel electrode 12. Herein, a drive element other than TFT 13 may be comprised of other materials provided they are matrix drive circuits utilized for a plane display element such as a liquid display and can be formed on a transparent substrate.

In a display apparatus of this invention, a metal ion is contained in polymer solid electrolyte layer 14, and the metal ion changes color by an electrical redox reaction. That is, visualization is possible by a reversible reaction of an electrochemical precipitation, which is so-called electrolytic plating, and elution as the reverse reaction of said precipitation. Metal ions, which can perform coloration and discoloration by such electrochemical precipitation and elution, are not specifically limited and include each ion of bismuth, copper, silver, lithium, iron, chromium, nickel and cadmium, or ions comprising combinations thereof. Preferable among them are a bismuth ion and a silver ion, because they can easily advance the reversible reaction.

Polymer solid electrolyte layer 14 is comprised of a matrix polymer being dissolved together with a support electrolyte, and said electrolyte includes lithium salts such as LiCl, LiBr, LiI, $LiBF_4$, $LiClO_4$, $LiPF_6$ and $LiCF_3SO_3$; potassium salts such as KCl, KI and KBr; sodium salts such as NaCl, NaI and NaBr; or tetraalkylammonium salts such as tetramethylammonium borofluoride, tetrabutylammonium perchlorate, tetrabutylammonium borofluoride and tetrabutylammonium halide. The alkyl chain lengths of the quarternary ammonium salts described above may be same or different, and appropriately utilized alone or in combination of at least two types.

In polymer solid electrolyte layer 14, a colorant is contained to improve the contrast, and commonly known inorganic pigments, organic pigments or dyes, provided a sufficient contrast can be obtained against the coloration by a redox reaction of a metal ion, may be utilized by appropriate selection. Herein, in the case that coloration of a metal ion is black as described above, preferably utilized is a white colorant having a high covering power as a background color, and such a colorant includes, for example, titanium dioxide, calcium carbonate, silica, magnesium oxide and aluminum oxide.

The mixing ratio of this colorant in the case of utilizing inorganic particles is preferably approximately 1-20 weight %, more preferably approximately 1-10 weight % and furthermore preferably 5-10 weight %. This is because inorganic white particles such as titanium oxide are not soluble but only dispersed in a polymer, and inorganic particles may coagulate when the mixing ratio increases resulting in uneven optical density. Further, since inorganic particles have no ionic conductivity, increase of the mixing ratio induces decrease of conductivity of polymer solid electrolyte layer 14. The upper limit of the mixing ratio is approximately 20 weight %, taking the both points into consideration.

Further, in polymer solid electrolyte layer 14, such as titanium oxide, calcium carbonate, magnesium oxide or aluminum oxide, the surface of which has been subjected to a surface treatment by a hydrophobicity providing agent, may be added as a colorant. This is preferable with respect to dispersibility at the time of preparation of a polymer solid electrolyte layer forming composition described later or preventing coagulation of colorant each other after polymer solid electrolyte layer has been formed, which results in maintaining the whiteness even when the apparatus is used for a long time.

A surface hydrophobicity providing agent to make the above-described colorant surface hydrophobic includes metal alkoxides, organometallic compounds having a bond between a metal and at least one halogen atom, or organometallic compounds having a metal-metal bond, and surface treatment is performed preferably by at least one type selected from these compounds.

Such metal alkoxides, organometallic compounds having a bond between a metal and at least one halogen atom, or organometallic compounds having a metal-metal bond include, for example, various alkoxides, organometallic compounds having a bond between a metal and at least one halogen atom, or organometallic compounds having a metal-metal bond, of silicon, germanium, titanium, tin, zirconium, aluminum, antimony, arsenic, barium, bismuth, boron, calcium, cerium, chromium, copper, erbium, gallium, hafnium, indium, iron, lanthanum, magnesium, manganese, neodymium, niobium, praseodymium, samarium, strontium, tantalum, tellurium, tungsten, vanadium, yttrium, and zinc, and specifically preferably of silicon, germanium, titanium, tin, zirconium and aluminum, among them.

Further, an alcohol component to constitute alkoxides includes straight chain or branched chain alcohols generally having a carbon number of approximately 1-12, and alkoxide compounds either may be comprised of all alcohols or provided with a ligand such as an unsubstituted or substituted alkyl group, an unsubstituted or substituted aryl group, and acetylacetone, provided there is at least one alkoxide in the compound. Further, as halogens to constitute organometallic compounds having a bond between a metal and at least one halogen atom, at least one type of a halogen atom selected from chlorine, bromine and iodine can be utilized without limitation, and these organometallic compounds may also be those provided with a ligand such as a bond between a metal and an unsubstituted or substituted alkyl group, a bond between a metal and an unsubstituted or substituted aryl group, and acetylacetone, provided the compound has at least one metal-halogen bond.

The mixing ratio of above-described titanium oxide, calcium carbonate, magnesium oxide and aluminum oxide which have been subjected to a surface treatment by a hydrophobicity providing agent is preferably approximately 1-20 weight %, more preferably approximately 1-10 weight % and furthermore preferably approximately 5-10 eight %.

Further, a mean particle diameter of the aforesaid colorant is preferably in a range of 0.1-1.0 μm with respect to a covering power and whiteness.

A matrix polymer utilized in a polymer solid electrolyte, which constitutes polymer solid electrolyte layer 14 containing a metal ion, includes polyethylene oxide, polypropylene oxide, polyethylene imine and polyethylene sulfide, and resin provided with them as a main chain structure or a branched chain structure. Further, resin such as polymethyl methacrylate, polyvinylidene fluoride, polyvinylidene chloride, polycarbonate and polyacrylonitrile can be also preferably utilized as a matrix polymer applied for a polymer solid electrolyte of this invention.

The layer thickness of polymer solid electrolyte layer 14 is preferably 20-200 μm, more preferably 50-150 μm and furthermore preferably 70-150 μm. The thinner is the layer, the smaller is the resistance between electrodes, resulting in decrease of coloration-discoloration time and depression of electricity consumption, which is preferable. However, when it is less than 20 μm, it is not preferable that mechanical strength is lowered to generate such as pinholes and cracks. Further, when it is too thin, the mixing amount of white particles becomes small resulting in insufficient covering power and whiteness (optical density).

Further, when the aforesaid polymer solid electrolyte layer 14 is formed, a solvent, such as water, ethyl alcohol, isopropyl alcohol, propylene carbonate, dimethyl carbonate, ethylene carbonate, γ-butyrolactone, acetonitrile, sulforane, dimethoxyethane, dimethylformamide, dimethylsulfoxide, dimethylacetoamide and N-metyl pyrrolidone may be appropriately added to prepare the polymer solid electrolyte layer forming composition.

Further, in the case of forming polymer solid electrolyte layer 14, an ionic fluid represented by $Q^+A^-$ may be added instead of the above-described solvent for the purpose of efficiently performing ionic conduction or decreasing the amount of the combustible liquid, and such an ionic fluid is a salt which presents as a liquid at 20-100° C., preferably at 20-80° C., more preferably at 20-60° C., furthermore preferably at 20-40° C. and specifically preferably at 20° C. The viscosity (at 25° C.) is not specifically limited provided being a melt at ordinary temperature, however, preferably 1-200 mPa.s. Further, a cationic component represented by $Q^+$ is preferably an onium cation and more preferably an ammonium cation, an imidazolium cation, a pyridinium cation and a sulfonium cation.

Specific examples of such an ionic fluid are described in WO95/18456, JP-A Nos. 8-245828, 8-259543, 10-92467, 10-265673, 2002-99001, 2002-11,0225, 2001-243995, European Patent No. 718288, Electrochemistry, Vol. 65, No. 11 923 (1997), J. Electrochem. Soc., Vol. 143, No. 10, 3099 (1996), and Inorg. Chem. 35, 1168-1178 (1996), and these can be utilized by appropriate selection.

Further, in this embodiment, a bluing agent or a fluorescent whitening agent may be added to improve visual whiteness by such as fluorescence or bluing, and these can be utilized by appropriate selection from commonly known compounds.

A bluing agent includes organic dyes and pigments or inorganic pigments which can provide blue coloring, specifically, such as ultramarine, cobalt blue, cobalt phosphate, quinacridone type pigment and mixtures thereof.

Fluorescent whitening agents described above include, for example, a stilbene type, a pyrazoline type, an oxazole type, a coumarin type, an imidazole type, a distyryl-biphenyl type, a thiazole type, a triazole type, an oxazole type, a thiadiazole type, a naphthalimide type, a benzoimidazole type, a benzooxazole type, a benzothiazole type, a acenaphthene type and a diaminostilbene type.

As specific examples of a bluing agent or a fluorescent whitening agent described above, those described in such as JP-A Nos. 6-322697, 7-181626, 8-118824, 8-175033, 10-44628, 11-60923, 11-295852, 11-286174, 2001-209149, 2001-232737 and 2002-284978, and Japanese Translated PCT Patent Publication Nos. 11-513736 and 2001-518919 can be utilized by appropriate selection.

Herein, the content of a bluing agent or a fluorescent whitening agent is preferably 10-100,000 ppm and. specifically preferably 50-10,000 ppm. When the content of a bluing agent or a fluorescent whitening agent is less than 10 ppm, there is a tendency of the emission quantity of fluorescence become small to decrease the bluing component of the reflective light resulting in insufficient whiteness due to yellowing of the film, which is not preferable. While the content of a bluing agent or a fluorescent whitening agent is over 100,000 ppm, color change, when a bluing agent or a fluorescent whitening agent are modified, becomes significant in the case of utilizing the display apparatus under conditions of ultraviolet irradiation or of high temperature and high humidity, resulting in possible deterioration of weather-proofing as a display apparatus.

In this invention, common electrode 15 is formed as the second electrode on the side facing to the first transparent electrode. This common electrode 15 is comprised of any material provided it is an electrochemically stable metal, and preferable are such as platinum, chromium, aluminum, cobalt and palladium, a layer of which can be prepared as a metal layer on a support by a commonly known method. Further, a coated layer on a support of conductive paint, which contains conductive particles such as carbon and conductive metal particles can be utilized as a common electrode provided a sufficient conductivity can be obtained, and further carbon can be utilized as a common electrode provided a metal utilized for a main reaction can be sufficiently supplied in advance or on demand. A method to make carbon be supported on an electrode includes a method in which carbon is made into ink by use of resin and printed on the substrate surface. The cost of an electrode can be decreased by utilizing carbon.

Figure 2:
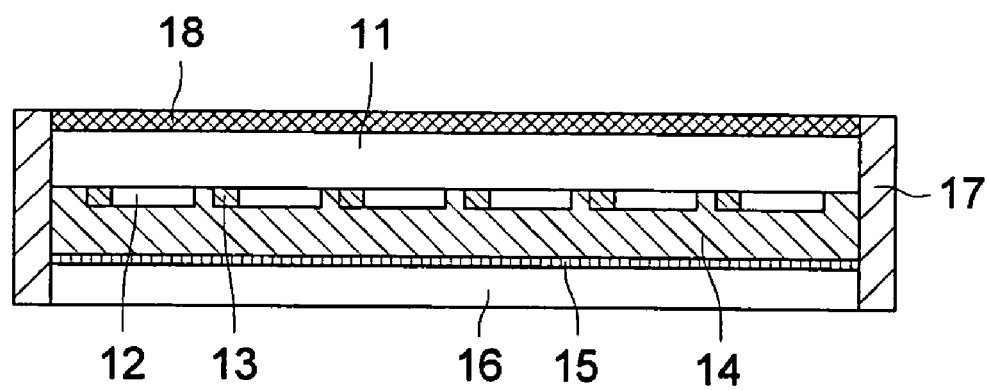
FIG. 2 is a cross-sectional drawing of a display apparatus according to this invention.
Figure 3:
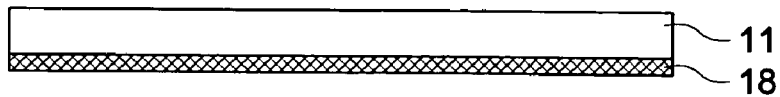
FIGS. 3(a)-3(f) are process cross-sectional drawings showing a manufacturing method of a display apparatus according to this invention.
Figure 3:
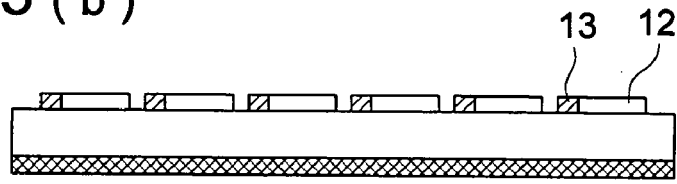
Figure 3:
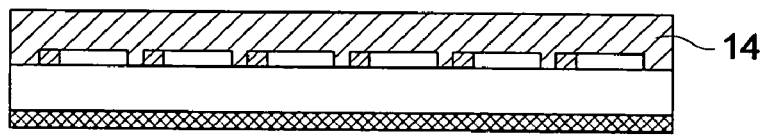
Figure 3:
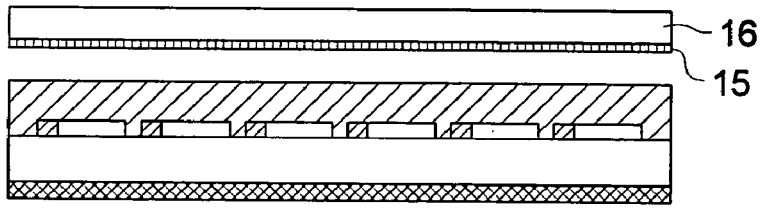
Figure 3:
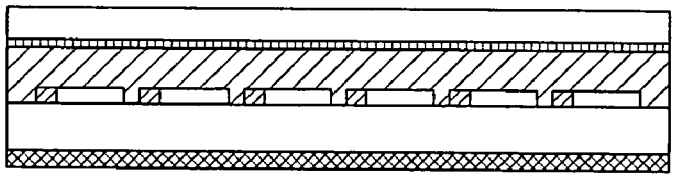
Figure 3:
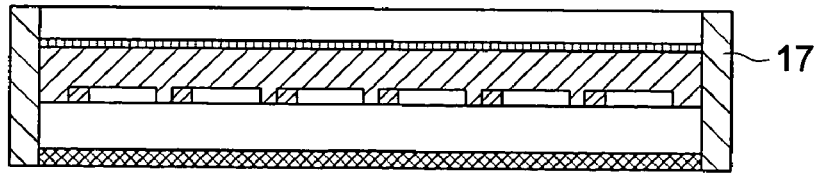
Figure 4:
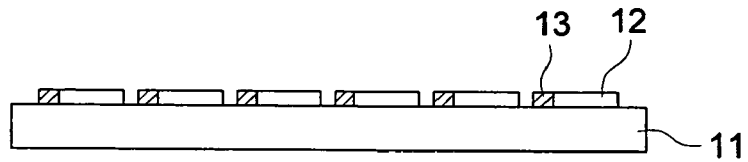
FIGS. 4(a)-4(f) are process cross-sectional drawings showing a manufacturing method of a display apparatus according to this invention.
Figure 4:
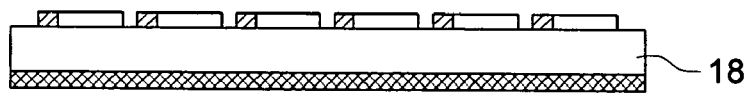
Figure 4:
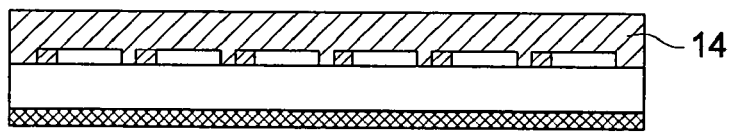
Figure 4:
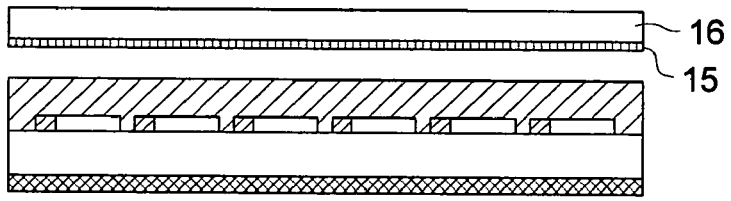
Figure 4:
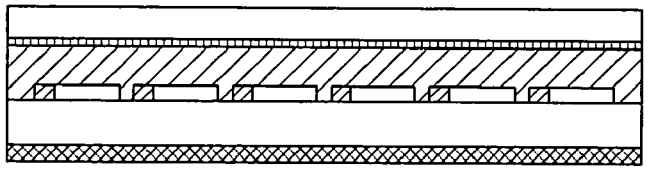
Figure 4:
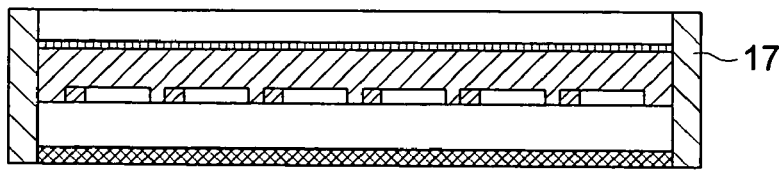

As support 16, the aforesaid support utilized to provide the first transparent electrode can be appropriately utilized; however, the second electrode is not necessarily transparent and such as a substrate and a film, which are possible to firmly hold such as a common electrode and a polymer solid electrolyte layer, can be utilized by appropriate selection. Further, as shown in FIG. 2, sealing member 17, which holds transparent support 11 and support 16, is arranged at the circumference of the apparatus so as to make the first transparent electrode side and the second electrode face to each other. Transparent support 11 and support 16, including transparent pixel electrode 12, TFT 13, polymer solid electrolyte layer 14 and common electrode which are arranged between them, are firmly held by this sealing member 17. Herein anti-reflecting layer 18 is arranged at the outermost layer to be observed of support 16, on which the first transparent electrode is provided.

According to the above-described structure, in an apparatus of this invention, matrix drive is possible by use of a TFT, contrast and black density can be increased by utilizing a metal ion contained in polymer solid electrolyte layer, and a display apparatus having a visually further improved reflectance can be prepared since an anti-reflecting layer having a lower refractive index is provided on the side on which a display portion is observed.

Next, a manufacturing method of a display apparatus of this invention will be detailed based on FIGS. 3(a) -3(f), FIGS. 4(a) -4(f) and FIGS. 5(a) -5(f).

Firstly, as shown in FIG. 3(a), an anti-reflecting layer 18 is formed by utilizing a commonly known method which is suitable to a compound to form anti-reflecting layer 18 and a transparent support. Such as a $MgF_2$ layer and a $AlF_2 \cdot MgF_2$ layer are formed on the whole substrate by means of evaporation or spattering method. Next, as shown in FIG. 3(b), transparent pixel electrode 12, which is comprised of an ITO layer, and TFT 13 are formed for each pixel on the surface of support 11 opposite to anti-reflecting layer 18. TFT 13 is formed by utilizing commonly known semiconductor manufacturing techniques, and an ITO layer is formed by a method such as evaporation and spattering. These transparent pixel electrode 12 and TFT 13 are formed for each pixel, and said each pixel is arranged in a matrix form on transparent support 11.

After transparent pixel electrode 12 and TFT 13 are formed on transparent support 11 in this manner, as shown in FIG. 3(c), polymer solid electrolyte layer 14 is formed on the surface of transparent support 11, on which transparent pixel electrode 12 and TFT 13 have been formed. In this process to form polymer solid electrolyte layer 14, first, in advance to form polymer solid electrolyte layer 14, the aforesaid resin to form a matrix polymer, a support electrolyte, a metal ion generating agent which can produce a metal ion and appropriately a solvent to dissolve these materials are mixed, and white particles as a colorant are further dispersed therein, resulting in preparation of a polymer solid electrolyte layer forming composition. Next, polymer solid electrolyte layer 14 is formed by coating this polymer solid electrolyte layer forming composition on a transparent support.

Separately, as shown in FIG. 3(d), a support provided with a common electrode is prepared by forming common electrode 15 comprising a palladium layer having a predetermined thickness on support 16 comprising such as polyethylene terephthalate, and the common electrode 15 side of this support provided with a common electrode is pressed onto polymer solid electrolyte layer 14 to be pasted up together as shown in FIG. 3(e). After having been pasted up, the laminate is dried under reduced pressure resulting in formation of polymer solid electrolyte layer 14 between support 16 and transparent support 11. Successively, sealing member 17 as shown in FIG. 3(f) is attached to the edge portion of the pasted-up laminate to complete a display apparatus in which anti-reflecting layer 18 is provided on the display side.

Figure 5A:
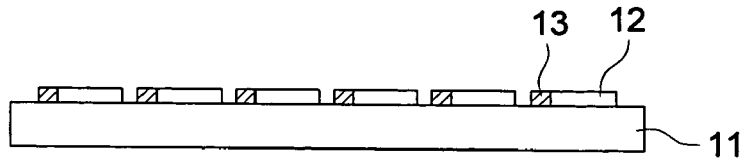
FIGS. 5(a)-5(f) are process cross-sectional-drawings showing a manufacturing method of a display apparatus according to this invention.

Further, FIGS. 5(a)-5(f) illustrate a manufacturing method of a display apparatus of the embodiment different from the manufacturing method shown in FIGS. 3(a)-3(f) and FIGS. 4(a)-4(f), and firstly, as shown in FIG. 5(a), transparent pixel electrode 12 comprising an ITO layer and TFT (Thin Layer Transistor) 13 are formed for each pixel on transparent support 11 such as a glass substrate. TFT 13 is formed by utilizing commonly known semiconductor manufacturing techniques, and an ITO layer is formed by a method such as evaporation and spattering. These transparent pixel electrode 12 and TFT 13 are formed for each pixel, and said each pixel is arranged in a matrix form on transparent support 11.

Figure 5B:
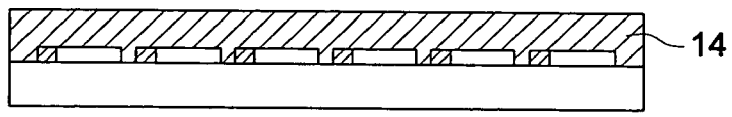

After transparent pixel electrode 12 and TFT 13 are formed on transparent support 11 in this manner, as shown in FIG. 5(b), polymer solid electrolyte layer 14 is formed on the surface of transparent support 11, on which transparent pixel electrode 12 and TFT 13 have been formed. In this process to form polymer solid electrolyte layer 14, first, in advance to form polymer solid electrolyte layer 14, the aforesaid resin to form a matrix polymer, a support electrolyte, a metal ion generating agent which can produce a metal ion and appropriately a solvent to dissolve these materials are mixed, and white particles as a colorant are further dispersed therein, resulting in preparation of a polymer solid electrolyte layer forming composition. Next, polymer solid electrolyte layer 14 is formed by coating this polymer solid electrolyte layer forming composition on a transparent support.

Figure 5C:
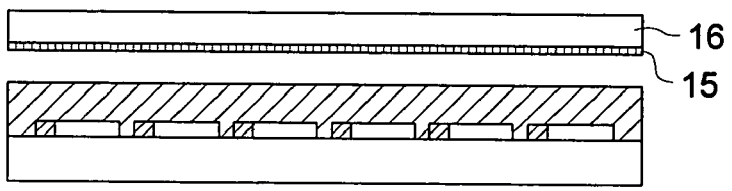
Figure 5D:
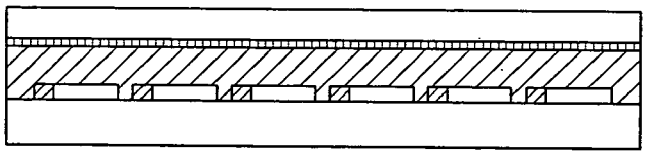
Figure 5E:
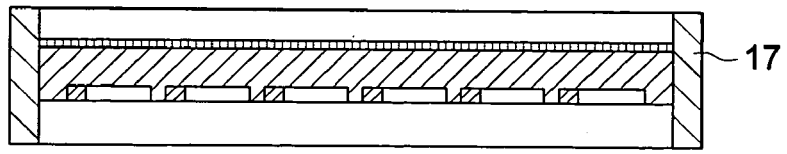
Figure 5F:
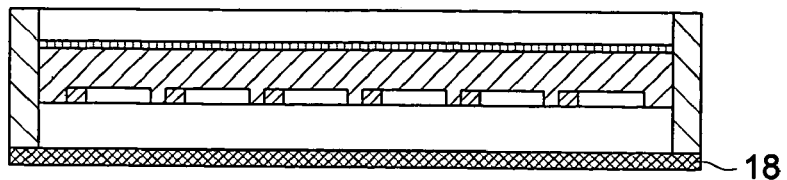

Separately, as shown in FIG. 5(c), a support provided with a common electrode is prepared by forming common electrode 15 comprising a palladium layer having a predetermined thickness on support 16 comprising such as polyethylene terephthalate, and the common electrode 15 side of the support provided with a common electrode is pressed onto polymer solid electrolyte layer 14 to be pasted up together as shown in FIG. 5(d). After having been pasted up, the laminate is dried under reduced pressure resulting in formation of polymer solid electrolyte layer 14 between support 16 and transparent support 11. Successively, sealing member 17 as shown in FIG. 5(e) is attached to the edge portion of the pasted-up laminate, and finally, as shown in FIG. 5(f), anti-reflecting layer 18, such as a $MgF_2$ layer and a $LiF_3 \cdot MgF_2$ layer being formed on the whole substrate by means of evaporation or spattering method, is formed according to a commonly known method on the image displaying surface of support 11, to complete a display apparatus in which anti-reflecting layer 18 is provided on the display side.

Figure 6:
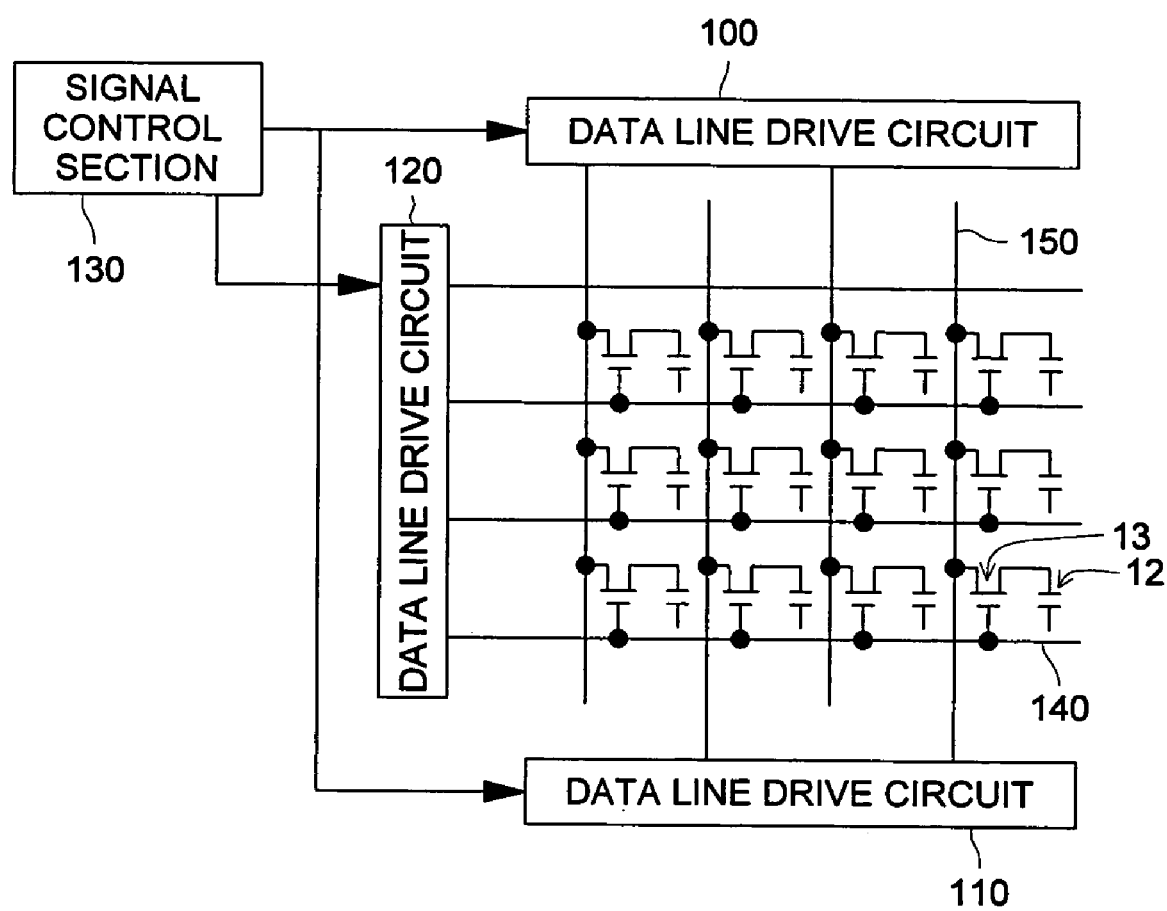
FIG. 6 is a block diagram of a display apparatus according to this invention.

FIG. 6 is a block diagram of a display apparatus. Transparent pixel electrode 12 for each pixel and corresponding TFT 13 are arranged in a matrix form, and the opposing electrode side of the capacity makes a common electrode. To the gate electrode of TFT 13 is connected gate line (scanning line wiring) 140, while the one end of the source and drain of TFT 13 each are connected to data line (data line wiring) 150. The other end of the source and drain of TFT 13 each are connected to transparent pixel electrode 12. Gate line 140 is connected to gate line drive circuit 120, and data line 150 is connected to data line drive circuit 100 and 110. Gate line drive circuit 120, data line drive circuit 100 and 110 are connected to signal control section 130.

EXAMPLES

In the following, the present invention will be explained according to examples, however, the present invention is not limited to these embodiments.

Example 1

(Manufacture of Display Apparatus, Preparation and Coating of Polymer Solid Electrolyte)

$MgF_2$ was evaporated from an evaporation source comprising $MgF_2$ onto a glass substrate of 1.5 mm thick and 10 ×10 cm in size to form an evaporated layer of $MgF_2$ having a thickness of 1600 Å, resulting in formation of an anti-reflecting layer. Next, an ITO layer and a TFT, which were arranged in a plane at a 150 μm pitch, were prepared on the surface opposite to the anti-reflecting layer of the glass substrate. Successively, 1 weight part of polyvinylidene fluoride having a molecular weight of approximately 350,000, 10 weight parts of a ¼ mixed solution of water and isopropylalcohol, 1.7 weight parts of lithium bromide and 1.7 weight parts of bismuth chloride were mixed and heated at 120° C. to prepare a homogeneous solution. Titanium dioxide, having a mean particle diameter of 0.5 μm, of 0.2 weight parts was added thereto and the resulting solution was uniformly dispersed by use of a homogenizer. Immediately after coating this solution on the above-described glass substrate by a doctor blade at a thickness of 60 μm, a common electrode explained below as the second electrode was pasted up thereon, and the resulting laminate was dried under reduced pressure at 110° C. and 0.05 MPa for 1 hour resulting in formation of a polymer solid electrolyte layer between two electrodes. Next, the edge surface of the laminate was sealed by an adhesive to prepare a display apparatus.

(The Second Electrode (Counter Electrode, Common Electrode))

A palladium layer having a thickness of 3000 Å was formed by means of spattering on a polyethylene terephthalate film having a 0.5 mm thick and 10 cm×10 cm in size. This was pressing adhered onto the above-described polymer solid electrolyte layer immediately after the layer had been coated.

(Evaluation of Drive and Display Characteristics)

Black color display and a colorless (white) display were switched by use of a commonly known active matrix drive circuit, by oxidizing a display electrode with a quantity of electricity of 5 μC per one pixel at the time of coloring and reducing with the same quantity of electricity at the time of discoloration. The reflectivity at the time of colorless (white) was 68%, and the optical density (OD) of the display portion at the time of coloring (black) was approximately 0.8 (a reflectivity of 8%). Therefore, as a contrast of reflectivity, ⅛.5 was obtained. After having been held in a colored state, the display apparatus was stored while opening the circuit, to show no significant change of optical density of the display portion and to maintain memory ability after 1 week.

(Sensual Evaluation of Identification)

When a display element prepared in above example 1 and one prepared in comparative example 1 shown below were evaluated by 50 persons, 90% of the persons have judged that the display apparatus provided with an anti-reflecting layer was easier to be seen.

Example 2

A display apparatus was prepared under similar conditions to example 1, except that silver perchloride was employed instead of bismuth chloride utilized in example 1.

Successively, the sample was driven and evaluated in a similar manner to example 1, to determine that the reflectivity at the time of colorless (white) was 70%, and the optical density (OD) of the display portion at the time of coloring (black) was approximately 1.0 (a reflectivity of 7%). Therefore, as a contrast of reflectivity, ¹/₁₀ was obtained. After having been held in a colored state, the display apparatus was stored while opening the circuit, to show no significant change of optical density of the display portion and to maintain memory ability after 1 week. Further, when the display apparatus prepared in example 2 and one prepared in comparative example 2 shown below were evaluated by 50 persons, 94% of the persons have judged that the display apparatus provided with an anti-reflecting layer was easier to be seen.

Example 3

(Manufacture of Display Apparatus, Preparation and Coating of Polymer Solid Electrolyte)

An ITO layer and a TFT, which were arranged in a plane at a 150 μm pitch, were formed onto a glass substrate of 1.5 mm thick and 10×10 cm in size according to a commonly known method. Next, spattering was performed onto the surface opposite to the surface, on which an ITO layer and a TFT were provided, of the glass substrate by utilizing an alloy comprising metal aluminum, in which metal magnesium was mixed at a atom composition ratio of 30%, as a metal target, and employing an Ar gas as a spatter gas and a 5% diluted $F_2$ gas as a reaction gas, resulting in formation of an $AlF_3 \cdot MgF_2$ anti-reflecting layer having a thickness of 300 nm. Successively, 1 weight part of polyvinylidene fluoride having a molecular weight of approximately 350,000, 10 weight parts of a ¼ mixed solution of water and isopropyl alcohol, 1.7 weight parts of lithium bromide and 1.7 weight parts of bismuth chloride were mixed and heated at 120° C. to prepare a homogeneous solution. Titanium dioxide, having a mean particle diameter of 0.5 μm, of 0.2 weight parts was added thereto and the resulting solution was uniformly dispersed by use of a homogenizer. Immediately after coating this solution on the above-described glass substrate by a doctor blade at a thickness of 60 μm, a common electrode explained in example 1 as the second electrode was pasted up thereon, and the resulting laminate was dried under reduced pressure at 110° C. and 0.05 MPa for 1 hour, resulting in formation of a polymer solid electrolyte layer between two electrodes. Next, the edge surface of the laminate was sealed by an adhesive to prepare a display apparatus.

Successively, the sample was driven and evaluated in a similar manner to example 1, to determine that the reflectivity when being colorless (white) was 70%, and the optical density (OD) of the display portion when being at the time of colored (black) was approximately 1.0 (a reflectivity of 6%). Therefore, as a contrast of reflectivity, ¹/₁₁.₇ was obtained. After having been held in a colored state, the display apparatus was stored while opening the circuit, to show no significant change of optical density of the display portion and to maintain memory ability after 1 week. Further, when the display apparatus prepared in example 3 and one prepared in comparative example 2 shown below were evaluated by 50 persons, 94% of the persons have judged that the display apparatus provided with an anti-reflecting layer was easier to be seen.

Example 4

(Manufacture of Display Apparatus, Preparation and Coating of Polymer Solid Electrolyte)

An ITO layer and a TFT, which were arranged in a plane at a 150 μm pitch, were formed onto a glass substrate of 1.5 mm thick and 10×10 cm in size according to a commonly known method. Successively, 1 weight part of polyvinylidene fluoride having a molecular weight of approximately 350,000, 10 weight parts of a ¼ mixed solution of water and isopropyl alcohol, 1.7 weight parts of lithium bromide and 1.7 weight parts of bismuth chloride were mixed and heated at 120° C. to prepare a homogeneous solution. Titanium dioxide, having a mean particle diameter of 0.5 μm, of 0.2 weight parts was added thereto and the resulting solution was uniformly dispersed by use of a homogenizer. Immediately after coating this solution on the above-described glass substrate by a doctor blade at a thickness of 60 μm, a common electrode explained in example 1 as the second electrode was pasted up thereon, and the resulting laminate was dried under reduced pressure at 110° C. and 0.05 MPa for 1 hour, resulting in formation of a polymer solid electrolyte layer between two electrodes. Then, the edge surface of the laminate was sealed by an adhesive. Next, $MgF_2$ was evaporated from an evaporation source comprising $MgF_2$ onto a glass substrate of 1.5 mm thick and 10×10 cm in size to form an evaporated layer of $MgF_2$ having a thickness of 1600 Å, resulting in formation of an anti-reflecting layer and preparation of a display apparatus.

Successively, the sample was driven and evaluated in a similar manner to example 1, to determine that the reflectivity when being colorless (white) was 70%, and the optical density (OD) of the display portion when being colored (black) was approximately 1.0 (a reflectivity of 7%). Therefore, as a contrast of reflectivity, 1/10 was obtained. After having been held in a colored state, the display apparatus was stored while opening the circuit, to show no significant change of optical density of the display portion and to maintain memory ability after 1 week. Further, when the display apparatus prepared in example 4 and one prepared in comparative example 2 shown below were evaluated by 50 persons, 94% of the persons have judged that the display apparatus provided with an anti-reflecting layer was easier to be seen.

Example 5

(Manufacture of Display Apparatus, Preparation and Coating of Polymer Solid Electrolyte)

$MgF_2$ was evaporated from an evaporation source comprising $MgF_2$ onto a glass substrate of 1.5 mm thick and 10×10 cm in size to form an evaporated layer of $MgF_2$ having a thickness of 1600 Å, resulting in formation of an anti-reflecting layer. Next, an ITO layer and a TFT, which were arranged in a plane at a 150 μm pitch, were prepared on the surface opposite to anti-reflecting layer of the glass substrate. Successively, 1 weight part of polyvinylidene fluoride having a molecular weight of approximately 350,000, 10 weight parts of a 1/1 mixed solution of water and isopropyl alcohol, 1.7 weight parts of lithium bromide and 1.7 weight parts of bismuth chloride were mixed and heated at 120° C. to prepare a homogeneous solution. Titanium dioxide, having a mean particle diameter of 0.5 μm, the surface of which had been subjected to a surface treatment by dimethyldichlorosilane, of 0.2 weight parts was added thereto and the resulting solution was uniformly dispersed by use of a homogenizer. Immediately after coating this solution on the above-described glass substrate by a doctor blade at a thickness of 60 μm, a common electrode explained in example 1 as the second electrode was pasted up thereon, and the resulting laminate was dried under reduced pressure at 110° C. and 0.05 MPa for 1 hour resulting in formation of polymer solid electrolyte layer between two electrodes. Next, the edge surface of the laminate was sealed by an adhesive to prepare a display apparatus.

Successively, the sample was driven and evaluated in a similar manner to example 1, to determine that the reflectivity when being colorless (white) was 70%, and the optical density (OD) of the display portion when being colored (black) was approximately 0.8 (a reflectivity of 8%). Therefore, as a contrast of reflectivity, 1/8.5 was obtained. After having been held in a colored state, the display apparatus was stored while opening the circuit, to show no significant change of optical density of the display portion and to maintain memory ability after 1 week. Further, when the display apparatus prepared in example 5 and one prepared in comparative example 3 shown below were evaluated by 50 persons, 90% of the persons have judged that the display apparatus provided with an anti-reflecting layer was easier to be seen. Further, the reflectivity of the colorless portion (white portion) was 70% after 1.5 months, which was not significantly changed.

Example 6

(Manufacture of Display Apparatus, Preparation and Coating of Polymer Solid Electrolyte)

An ITO layer and a TFT, which were arranged in a plane at a 150 μm pitch, were formed onto a glass substrate of 1.5 mm thick and 10×10 cm in size according to a commonly known method. Next, spattering was performed onto the surface opposite to the surface, on which an ITO layer and a TFT were provided, of the glass substrate by utilizing an alloy comprising metal aluminum, in which metal magnesium was mixed at a atom composition ratio of 30%, as a metal target, and employing an Ar gas as a spatter gas and a 5% diluted $F_2$ gas as a reaction gas, resulting in formation of an $AlF_3 \cdot MgF_2$ anti-reflecting layer having a thickness of 300 nm.

Successively, 1 weight part of polyvinylidene fluoride having a molecular weight of approximately 350,000, 10 weight parts of a 1/1 mixed solution of water and isopropyl alcohol, 1.7 weight parts of lithium bromide and 1.7 weight parts of bismuth chloride were mixed and heated at 120° C. to prepare a homogeneous solution. Titanium dioxide, having a mean particle diameter of 0.5 μm and having been subjected to a surface treatment by γ-glycidoxypropyl trimethoxysilane, of 0.2 weight parts was added thereto and the resulting solution was uniformly dispersed by use of a homogenizer. Immediately after coating this solution on the above-described glass substrate by a doctor blade at a thickness of 60 μm, a common electrode explained in example 1 as the second electrode was pasted up thereon, and the resulting laminate was dried under reduced pressure at 110° C. and 0.05 MPa for 1 hour, resulting in formation of a polymer solid electrolyte layer between two electrodes. Next, the edge surface of the laminate was sealed by an adhesive to prepare a display apparatus.

Successively, the sample was driven and evaluated in a similar manner to example 1, to determine that the reflectivity when being colorless (white) was 72%, and the optical density (OD) of the display portion when being at the time of colored (black) was approximately 1.0 (a reflectivity of 7%). Therefore, as a contrast of reflectivity, 1/10 was obtained. After having been held in a colored state, the display apparatus was stored while opening the circuit, to show no significant change of optical density of the display portion and to maintain memory ability after 1 week. Further, when the display apparatus prepared in example 3 and one prepared in comparative example 2 shown below were evaluated by 50 persons, 94% of the persons have judged that the display apparatus provided with an anti-reflecting layer was easier to be seen. Further, the reflectivity of the colorless portion (white portion) was 72% even after 1.5 months, which was not significantly changed.

Example 7

A display apparatus was prepared in a similar manner to example 1, except that titanium oxide having a mean particle diameter of 0.5 μm and having been subjected to a surface treatment by methyl trimethoxysilane in stead of titanium dioxide, having a mean particle diameter of 0.5 μm and having been subjected to a surface treatment by γ-glycidoxypropyl trimethoxysilane, which was utilized in example 6. Successively, the sample was driven and evaluated in a similar manner to example 1, to determine that the reflectivity when being colorless (white) was 72%, and the optical density (OD) of the display portion when being colored (black) was approximately 1.0 (a reflectivity of 7%). Therefore the contrast of reflectivity was 1/7. After having been held in a colored state, the display apparatus was stored while opening the circuit, to show no significant change of optical density of the display portion and to maintain memory ability after 1 week. Further, when the display apparatus prepared in example 7 and one prepared in comparative example 4 shown below were evaluated by 50 persons, 94% of the persons have judged that the display apparatus provided with an anti-reflecting layer was easier to be seen. Further, the reflectivity of the colorless portion (white portion) was 72% even after 1.5 months, which was not significantly changed.

Comparative Example 1

A display apparatus was prepared under conditions similar to example 1, except that anti-reflecting layer, which was formed on a glass substrate in example 1, was not provided. Successively, the sample was driven and evaluated in a similar manner to example 1, to determine that the reflectivity when being colorless (white) was 70%, and the optical density (OD) of the display portion when being colored (black) was approximately 0.8 (a reflectivity of 13%). Therefore the contrast of reflectivity was 1/5. After having been held in a colored state, the display apparatus was stored while opening the circuit, to show no significant change of optical density of the display portion and to maintain memory ability after 1 week.

Comparative Example 2

A display apparatus was prepared under conditions similar to example 4, except that anti-reflecting layer, which was formed on a glass substrate in example 4, was not provided. Successively, the sample was driven and evaluated in a similar manner to example 1, to determine that the reflectivity when being colorless (white) was 72%, and the optical density (OD) of the display portion when being colored (black) was approximately 1.0 (a reflectivity of 10%). Therefore the contrast of reflectivity was 1/7. After having been held in a colored state, the display apparatus was stored while opening the circuit, to show no significant change of optical density of the display portion and to maintain memory ability after 1 week.

Comparative Example 3

A display apparatus was prepared under conditions similar to example 5, except that anti-reflecting layer, which was formed on a glass substrate in example 5, was not provided and titanium dioxide without a surface treatment and having a mean particle diameter of 0.5 μm was utilized instead of titanium dioxide having been subjected to a surface treatment by dimethyldichlorosilane and having a mean particle diameter of 0.5 μm. Successively, the sample was driven and evaluated in a similar manner to example 1, to determine that the reflectivity when being colorless (white) was 70%, and the optical density (OD) of the display portion when being colored (black) was approximately 0.8 (a reflectivity of 13%). Therefore the contrast of reflectivity was 1/5. After having been held in a colored state, the display apparatus was stored while opening the circuit, to show no significant change of optical density of the display portion and to maintain memory ability after 1 week. Further, the reflectivity of the colorless portion (the white portion) after 1.5 months was 66%, which was somewhat deteriorated.

Comparative Example 4

A display apparatus was prepared under conditions similar to example 6, except that anti-reflecting layer, which was formed on a glass substrate in example 6, was not provided and titanium dioxide without a surface treatment and having a mean particle diameter of 0.5 μm was utilized instead of titanium dioxide having been subjected to a surface treatment by γ-glycidoxypropyl trimethoxysilane and having a mean particle diameter of 0.5 μm. Successively, the sample was driven and evaluated in a similar manner to example 1, to determine that the reflectivity when being colorless (white) was 72%, and the optical density (OD) of the display portion when being colored (black) was approximately 1.0 (a reflectivity of 10%). Therefore the contrast of reflectivity was 1/7. After having been held in a colored state, the display apparatus was stored while opening the circuit, to show no significant change of optical density of the display portion and to maintain memory ability after 1 week. Further, the reflectivity of the colorless portion (the white portion) after 1.5 months was 67%, which was somewhat deteriorated.

The present invention can provide a display element, a display apparatus and a manufacturing method thereof, utilizing a material, which has an increased whiteness of a background as a visual characteristic and changes color by an electrochemical redox reaction, as a display material.

What is claimed is:

1. A display element comprising: (a) a first electrode which is transparent and is controlled by a driver element; (b) a second electrode; and (c) a solid polymer electrolyte layer containing a colorant and metal ions, wherein:
    said metal ions are chosen from silver ions, bismuth ions, and mixtures thereof;
    said solid polymer electrolyte layer is provided between the first electrode and the second electrode;
    said colorant is selected from the group consisting of a powder of titanium oxide, calcium carbonate, magnesium oxide and aluminum oxide, wherein a surface of the powder is treated with a hydrophobicity-giving agent; and
    the first electrode has an anti-reflecting layer on a side opposite to the solid polymer electrolyte layer.

2. The display element of claim 1, wherein the first electrode is provided on a transparent substrate.

3. The display element of claim 2, wherein the anti-reflecting layer has a smaller reflection index than the transparent substrate.

4. The display element of claim 3, wherein the anti-reflecting layer contains a fluorinated compound as a main component.

5. The display element of claim 1, wherein an average diameter of the colorant is from 0.1 to 1.0 μm.

6. The display element of claim 1, wherein the hydrophobicity-giving agent is a metal alkoxide, an organometallic compound containing a metal-to-halogen bond in the molecule or an organometallic compound containing a metal-to-metal bond in the molecule.

7. The display element of claim 1, wherein the first electrode which is transparent comprises $SnO_2$, $In_2O_3$ or mixtures thereof.

8. The display element of claim 1, wherein the second electrode is a metallic thin film.

9. The display element of claim 1, wherein the solid polymer electrolyte is selected from the group consisting of polyethyleneoxide, polypropyleneoxide, polyethyleneimine, polyethyelenesulfide, polymethylmethacrylate, polyfluorovinylidene, polychlorovinylidene, polycarbonate, polyacryonitrile and mixtures thereof, or a plurality of layers thereof; provided that the solid polymer electrolyte further contains a metal sait or an alkylammonium salt.

10. A display apparatus comprising a plurality of display elements according to claim 1, wherein said display apparatus forms a display panel.

11. The display element of claim 1, wherein the solid polymer electrolyte layer further comprises a bluing agent or a fluorescent whitening agent.

12. A method of producing a display apparatus comprising the steps in the order named:
   (a) forming an anti-reflecting layer on a transparent substrate;
   (b) forming a transparent electrode and a driver element on the transparent substrate on a side opposite to the anti-reflecting layer;
   (c) forming a solid polymer electrolyte layer containing a colorant and metal ions on the transparent substrate, wherein:
   said metal ions are chosen from silver ions, bismuth ions, and combinations thereof;
   said colorant is selected from the group consisting of a powder of titanium oxide, calcium carbonate, magnesium oxide, and aluminum oxide, wherein a surface of the powder is treated with a hydrophobicity-giving agent; and
   (d) forming a common electrode at an opposed position to the transparent electrode.

13. A method of producing a display apparatus comprising the steps in the order named:
   (a) forming a transparent electrode and a driver element on a transparent substrate;
   (b) forming a solid polymer electrolyte layer containing a colorant and metal ions on the transparent substrate, wherein:
   said metal ions beingare chosen from silver ions, bismuth ions, and combinations thereof;
   said colorant is selected from the group consisting of a powder of titanium oxide, calcium carbonate, magnesium oxide, and aluminum oxide, wherein a surface of the powder is treated with a hydrophobicity-giving agent;
   (c) forming a common electrode at an opposed position to the transparent electrode; and
   (d) forming an anti-reflecting layer on the transparent substrate at a side opposite to the transparent electrode and the driver element.

14. A method of producing a display apparatus comprising the steps in the order named:
   (a) forming a transparent electrode and a driver element on a transparent substrate;
   (b) forming an anti-reflecting layer on the transparent substrate at a side opposite to the transparent electrode and the driver element;
   (c) forming a solid polymer electrolyte layer containing a colorant and metal ions on the transparent substrate on a side which is formed the transparent electrode and the driver element, wherein:
   said metal ions being chosen from silver ions, bismuth ions, and combinations thereof;
   said colorant is selected from the group consisting of a powder of titanium oxide, calcium carbonate, magnesium oxide, and aluminum oxide, wherein a surface of the powder is treated with a hydrophobicity-giving agent; and
   (d) forming a common electrode at an opposed position to the transparent electrode.

* * * * *